US009852758B1

(12) United States Patent
McIntosh et al.

(10) Patent No.: US 9,852,758 B1
(45) Date of Patent: Dec. 26, 2017

(54) PREVENTING CONDENSATION IN A TAPE LIBRARY

(71) Applicant: International Business Machines Corporation, Armonk, NY (US)

(72) Inventors: Michael P. McIntosh, Tucson, AZ (US); Shawn M. Nave, Tucson, AZ (US); Michael J. Talty, Fairport, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/367,445

(22) Filed: Dec. 2, 2016

(51) Int. Cl.
G11B 23/02 (2006.01)
G11B 15/68 (2006.01)
G11B 33/10 (2006.01)
G11B 33/14 (2006.01)

(52) U.S. Cl.
CPC .......... *G11B 23/021* (2013.01); *G11B 15/689* (2013.01); *G11B 33/10* (2013.01); *G11B 33/142* (2013.01); *G11B 33/144* (2013.01); *G11B 33/1453* (2013.01); *G11B 15/682* (2013.01)

(58) Field of Classification Search
None
See application file for complete search history.

(56) References Cited

U.S. PATENT DOCUMENTS

| 6,819,560 | B2 | 11/2004 | Konshak et al. |
| 6,853,305 | B2 | 2/2005 | Acosta-Geraldino et al. |
| 7,876,556 | B2 | 1/2011 | Katakura et al. |
| 9,176,564 | B2 | 11/2015 | Coxe, Jr. et al. |
| 2003/0088334 | A1* | 5/2003 | Enochs et al. ....... G11B 15/689 700/245 |
| 2014/0238639 | A1 | 8/2014 | Ambriz et al. |

FOREIGN PATENT DOCUMENTS

WO 9711462 A1 3/1997

OTHER PUBLICATIONS

Alissa et al, "Empirical Analysis of Blower Cooling Failure in Containment: Effects on IT Performance", Thermal and Thermomechanical Phenomena in Electronic Systems (ITherm), 2016 15th IEEE Intersociety Conference, May 31-Jun. 3, 2016, pp. 1426-1434.
Jesionowski, et al., "Integrated Cooling in Automated Tape Libraries", U.S. Appl. No. 15/146,833, filed May 4, 2016, 63 pages.

* cited by examiner

*Primary Examiner* — Craig A. Renner
(74) *Attorney, Agent, or Firm* — Stephanie L. Carusillo

(57) ABSTRACT

In an approach for preventing damage to a tape library, a processor receives a first sensor reading, wherein the first sensor is located within a tape library. A processor receives a second sensor reading, wherein the second sensor is located external to the tape library. A processor determines that the second sensor reading is greater than or equal to the first sensor reading. A processor receives an indication that a door to the tape library is open. Responsive to receiving the indication that the door to the tape library is open, a processor disables a fan.

7 Claims, 6 Drawing Sheets

PREVENTING CONDENSATION IN A TAPE LIBRARY

BACKGROUND

The present invention relates generally to the field of temperature controlled systems, and more particularly to a temperature controlled system for a tape library.

In computer storage, a tape library, sometimes called a tape silo, tape robot or tape jukebox, is a storage device which contains one or more tape drives, a number of slots to hold tape cartridges, a barcode reader to identify tape cartridges and an automated method for loading tapes, such as a robotic arm. Automated tape libraries can have cooling systems that allow the inside of the tape library to stay at a cool temperature and dry humidity even when the conditions outside the library are hot and humid. Servicing of the tape library is done periodically or as needed, such as when one of the robotic arm components needs maintenance.

SUMMARY

Aspects of an embodiment of the present invention disclose a method, computer program product, and computer system for preventing damage to a tape library. A processor receives a first sensor reading, wherein the first sensor is located within a tape library. A processor receives a second sensor reading, wherein the second sensor is located external to the tape library. A processor determines that the second sensor reading is greater than or equal to the first sensor reading. A processor receives an indication that a door to the tape library is open. Responsive to receiving the indication that the door to the tape library is open, a processor disables a fan.

DETAILED DESCRIPTION

Embodiments of the present invention recognize the concern over condensation occurring in a tape library. When the conditions outside the tape library are significantly hotter and more humid than the conditions inside the tape library, servicing the tape library can interfere with the tape library's cooling system. For example, when a door of a tape library is opened for a typical service procedure, such as servicing one of the robotic components, the cooling fans in tape drive canisters may pull the outside hot and humid air into the tape library and condensation can occur on sensitive components. In some instances, condensation can cause early failures of tape drives due to, for example, corrosion and shorting of the tape drive heads. Thus, there is a need for an approach to stop hot and humid air from getting into the tape library and letting condensation cause corrosion of components. Embodiments of the present invention provide a solution to the problem of the tape drive canisters being exposed to hot and humid air. In this manner, as discussed in greater detail herein, embodiments of the present invention can provide a way to determine, based at least in part, on the internal and external temperatures and humidities of a tape library, when a cooling system of the tape library should be set to a mode in which the cooling fans shut off when a door to the tape library is opened.

The present invention will now be described in detail with reference to the Figures.

Figure 1A:
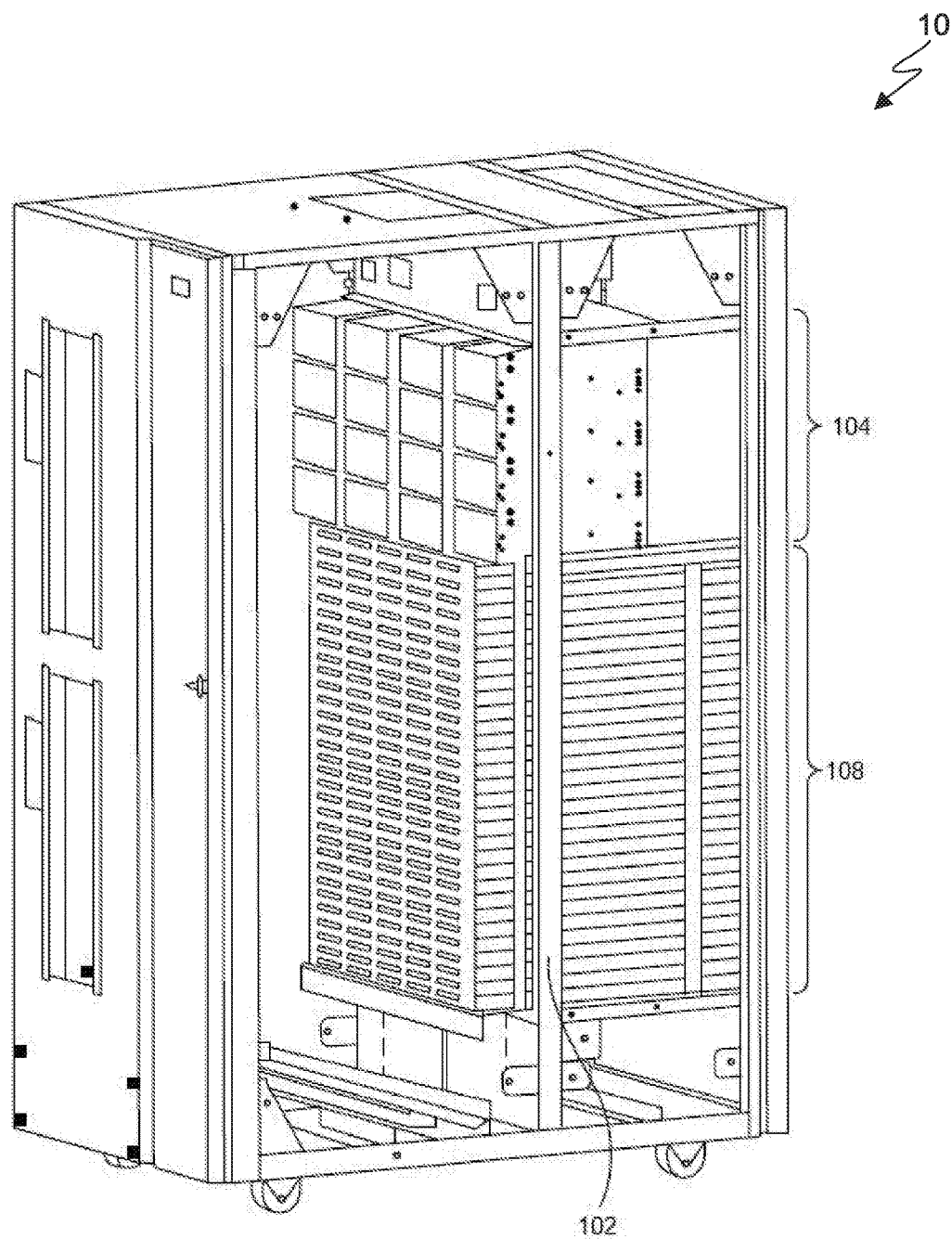
FIGS. 1A-1B are perspective views of an automated tape library according to one embodiment.
Figure 1B:
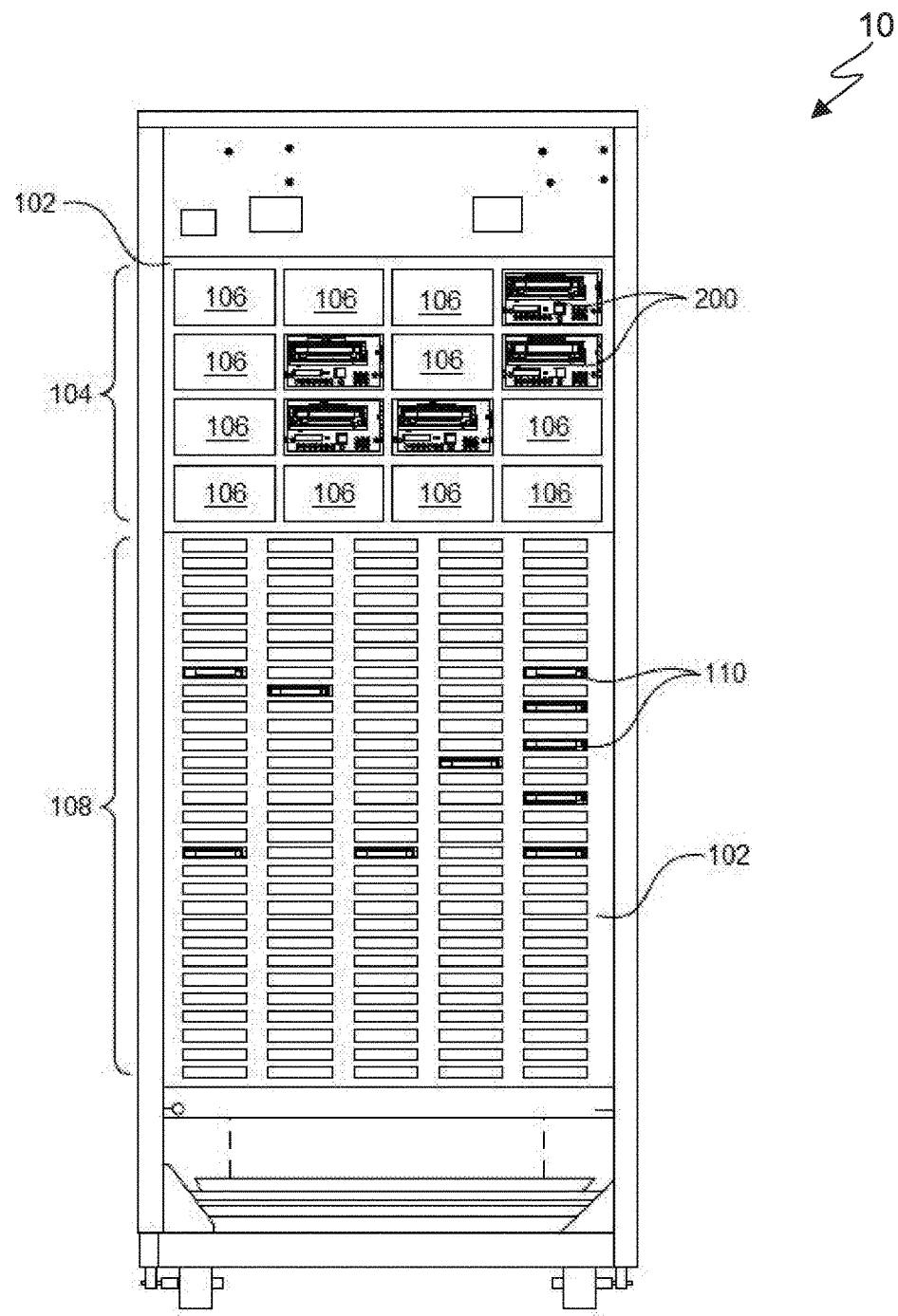

FIG. 1A is an isometric view of automated tape library 10 with no robotic arm shown. FIG. 1B is a front view of automated tape library 10 with the front door removed to better show the tape drive canisters 200 and tape drive canister bays 106 which are adapted for accepting tape drive canisters.

As can be seen from FIGS. 1A and 1B, the tape drive canisters 200 are packed into the frame 102 of the tape library 10, with, according to one embodiment, at least sixteen tape drive canisters 200 to be positioned in a tape drive canister bay array 104 in an upper portion of the frame 102 while a plurality of tape cartridges 110 are capable of being stored in a plurality of tape cartridge storage shelves 108 in a lower portion of the frame 102.

Figure 2:
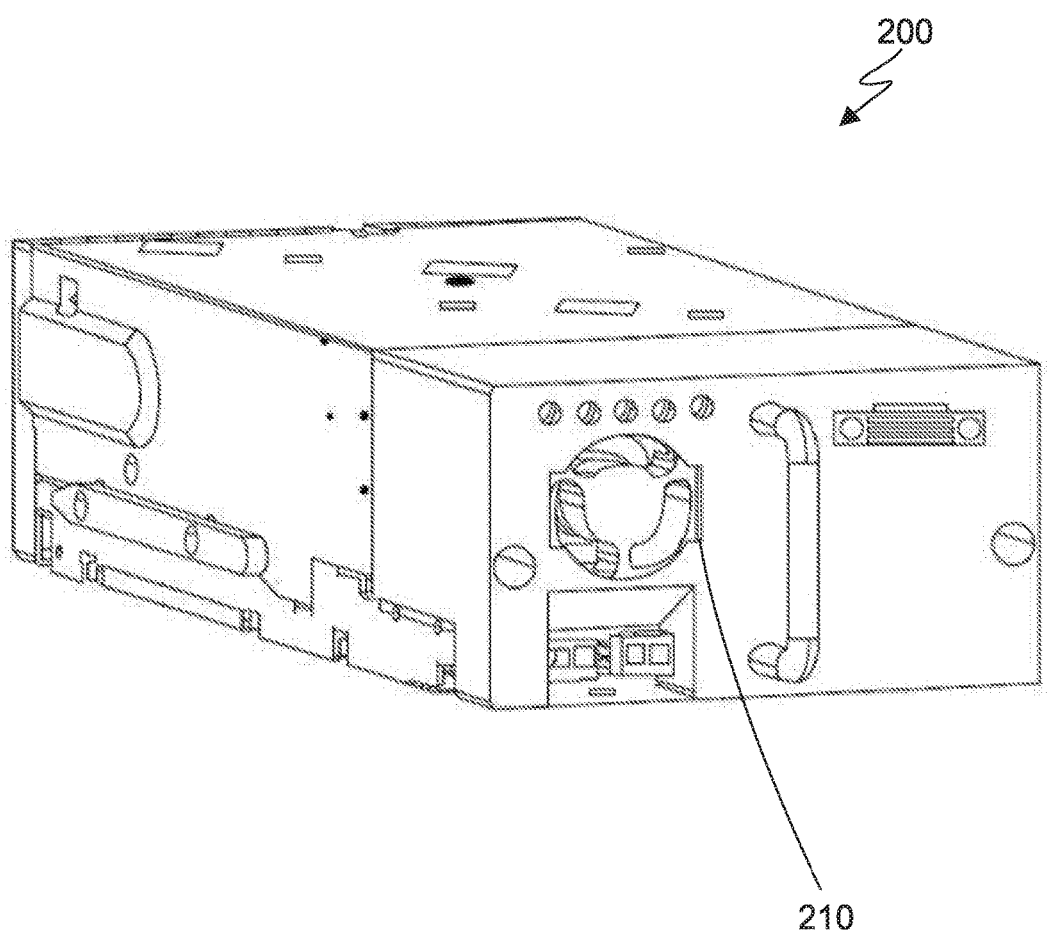
FIG. 2 is a perspective view of a tape drive canister from the automated tape library of FIGS. 1A-1B.

FIG. 2 illustrates a tape drive canister 200 according to one embodiment with fan 210 that is enclosed within the canister but can be seen through an exhaust opening in tape drive canister 200.

Figure 3:
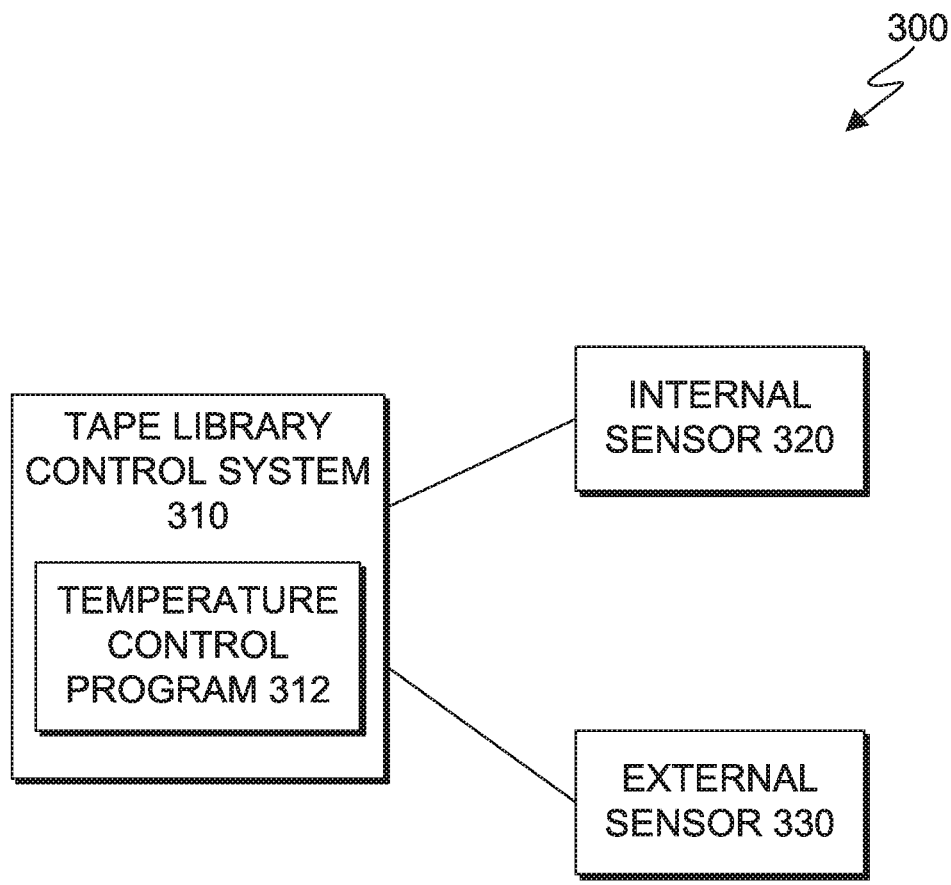
FIG. 3 is a functional block diagram illustrating a tape library environment, in accordance with an embodiment of the present invention.

FIG. 3 depicts a diagram of tape library environment 300, in accordance with an embodiment of the present invention. FIG. 3 provides only an illustration of one embodiment and does not imply any limitations with regard to the environments in which different embodiments may be implemented.

In the depicted embodiment, tape library environment 300 includes tape library control system 310, internal sensor 320, and external sensor 330.

Tape library control system 310 operates to manage the systems of automated tape library 10, including, but not limited to, a cooling system and door interlock switches, and run temperature control program 312. In an embodiment, tape library control system 310 may be a management server, a web server, or any other electronic device or computing system capable of running a program and receiving and sending data. In some embodiments, tape library control system 310 may be a laptop computer, tablet computer, netbook computer, personal computer (PC), a desktop computer, a smart phone, or any programmable electronic device. In other embodiments, tape library control system 310 may represent a server computing system utilizing multiple computers as a server system, such as in a cloud computing environment. In the depicted embodiment, tape library control system 310 contains temperature control program 312. In the depicted embodiment, tape library control system 310 sends to and receives data from internal sensor 320, external sensor 330. Tape library control system 310 may include components as depicted and described in further detail with respect to FIG. 5.

Temperature control program 312 operates to monitor the internal and external temperatures of an automated tape library, such as automated tape library 10, and determine if tape drive canister cooling fans, such as fan 210, are to be shut off when an enclosure door of the automated tape library is opened. In the depicted embodiment, temperature control program 312 resides on tape library control system 310. In another embodiment, temperature control program 312 may reside elsewhere within tape library environment 400 provided temperature control program 312 can communicate with tape library control system 310, internal sensor 320, and external sensor 330. Temperature control program 312 is described in further detail with respect to FIG. 4.

Internal sensor 320 and external sensor 330 operate to measure physical qualities associated with an automated tape library, such as automated tape library 10. A sensor measures physical qualities such as, but not limited to, temperature, light, heat, and humidity. In an embodiment, internal sensor 320 and external sensor 330 measure the temperature and/or humidity of the immediate surrounding area. For example, internal sensor 320 and external sensor 330 could include, but not limited to, a thermistor, thermocouple, resistance temperature detector (RTD), semiconductor-based sensor, capacitive humidity sensor, resistive humidity sensor, and thermal conductivity sensor. In the depicted embodiment, internal sensor 320 and external sensor 330 communicate with and send sensor data to temperature control program 312. In an embodiment, internal sensor 320 is located inside the automated tape library on a robotic component. In another embodiment, internal sensor 320 is located inside the tape library in a tape drive canister, such as tape drive canister 200. In an embodiment, external sensor 330 is located outside of the automated tape library near an enclosure door. In another embodiment, external sensor 330 is located outside of the automated tape library on an enclosure door. It should be appreciated that internal sensor 320 and external sensor 330 depicted in FIG. 3 are merely representative of a possible multiple number of internal and external sensors that could be in tape library environment 300 located on robotic components and in tape drive canisters.

Figure 4:
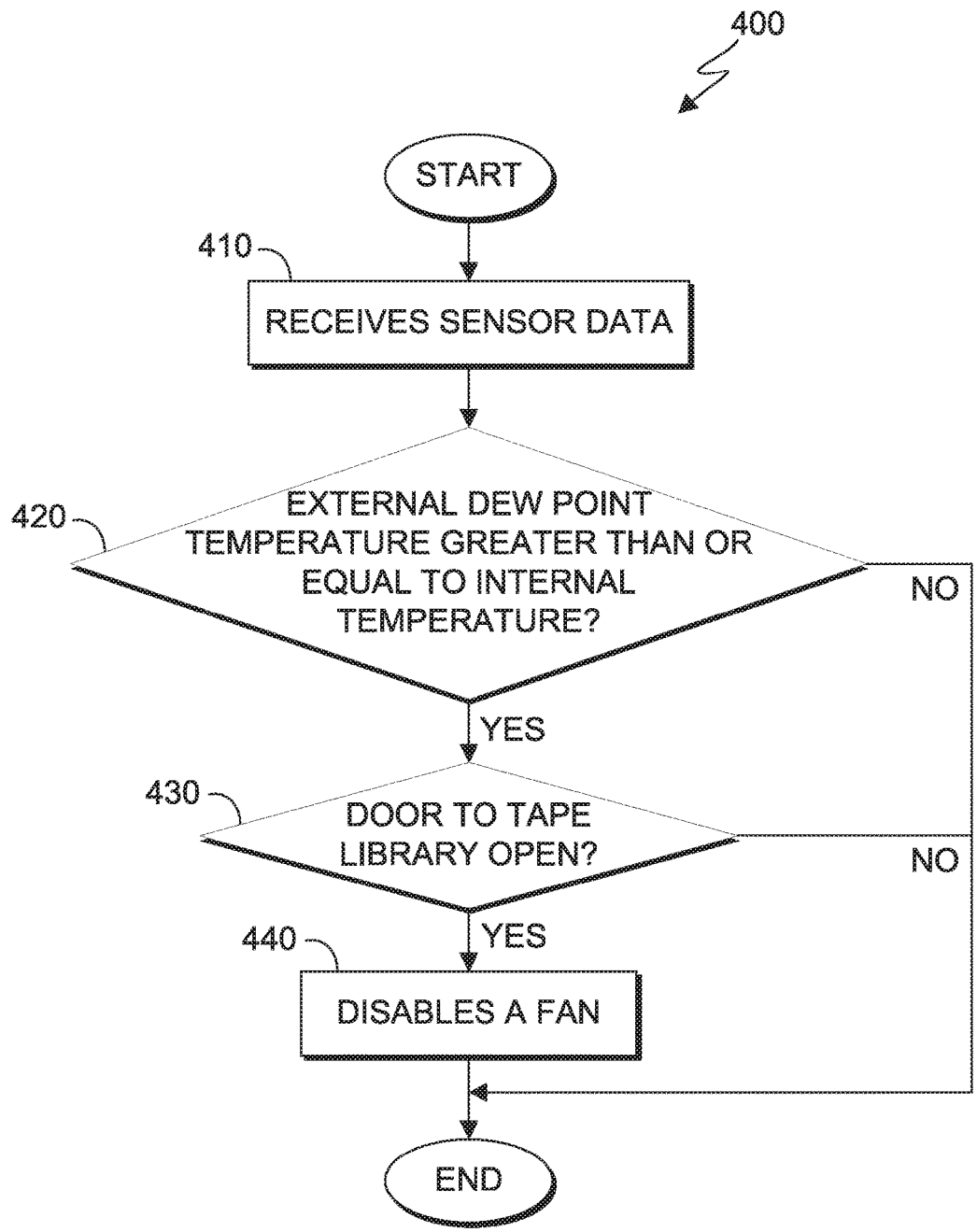
FIG. 4 is a flowchart depicting operational steps of a temperature control program, on a computing device within the tape library environment of FIG. 3, in accordance with an embodiment of the present invention.

FIG. 4 depicts a flowchart 400 of the steps of temperature control program 312, executing within tape library environment 300 of FIG. 3, in accordance with an embodiment of the present invention. In the depicted embodiment, temperature control program 312 operates to monitor the internal and external temperatures of an automated tape library to determine if cooling fans need to be shut off when an enclosure door of the tape library is opened. It should be appreciated that the process depicted in FIG. 4 illustrates one iteration of temperature control program 312 which runs every preset interval. For example, temperature control program 312 can be set to run every second.

In step 410, temperature control program 312 receives sensor data. Sensor data includes, but is not limited to, sensor readings from the immediate surrounding area of each sensor of the temperature and/or humidity. In an embodiment, temperature control program 312 receives sensor data periodically from internal sensor 320 and external sensor 330. In another embodiment, temperature control program 312 receives sensor data after temperature control program 312 sends a request to a sensor for sensor data.

In decision 420, temperature control program 312 determines whether the dew point temperature of the external ambient air is greater than or equal to the temperature inside the tape library. A dew point temperature is the temperature at which a given concentration of water vapor in air will form dew or condensation. In an embodiment, temperature control program 312 determines the dew point temperature of the external ambient air outside of the tape library by using psychrometric principles and the temperature and humidity sensor data received from external sensor 330. In an embodiment, temperature control program 312 continuously determines the dew point temperature as temperature and humidity sensor data is received from external sensor 330. In an embodiment, temperature control program 312 compares the determined dew point temperature of the external ambient air to the temperature sensor data received by internal sensor 320. In an embodiment, temperature control program 312 continuously compares the determined dew point temperature of the external ambient air to the temperature sensor data received by internal sensor 320.

If in decision 420, temperature control program 312 determines that the external dew point temperature is greater than or equal to the internal temperature, then, temperature control program 312 goes on to determine if a door to the tape library is open (see decision 430). If in decision 420, temperature control program 312 determines that the external dew point temperature is less than the internal temperature, then, temperature control program 312 ends one iteration.

In decision 430, temperature control program 312 determines whether a door to the tape library is open. In an embodiment, if tape library control system 310 receives an indication from door interlock switches that a door to the tape library is open, temperature control program 312 determines that a door to the tape library is open.

If in decision 430, temperature control program 312 determines that a door to the tape library is open, then, temperature control program 312 goes on to disable a fan, such as fan 210 (see step 440). If in decision 430, temperature control program 312 determines that no door to the tape library is open, then, temperature control program 312 ends one iteration.

In another embodiment, decision 430 occurs before step 410 to determine whether a door to the tape library is open. In this embodiment, if tape library control system 310 receives an indication from door interlock switches that a door to the tape library is open, temperature control program 312 determines that a door to the tape library is open. In this embodiment, if in decision 430, temperature control program 312 determines that a door to the tape library is open, temperature control program 312 requests sensor data from a sensor and receives sensor data (step 410). If in decision 430, temperature control program 312 determines that no door to the tape library is open, temperature control program 312 ends one iteration.

In step 440, temperature control program 312 disables a fan. In an embodiment, a fan is located in each tape drive canister in a tape library, such as fan 210 in tape drive canister 200 of automated tape library 10. In an embodiment, temperature control program 312 disables the fan in each tape drive canister in a tape library. In an embodiment, temperature control program 312 restarts the fans after a pre-determined time delay or after a variable time delay, determined by internal temperature and humidity sensor readings that allows a tape library cooling system managed by tape library control system 310 to sufficiently process the interior air to remove any risk of condensation. In another embodiment, temperature control program 312 restarts the fans when tape library control system 310 receives an indication from door interlock switches that all tape library doors are closed.

Figure 5:
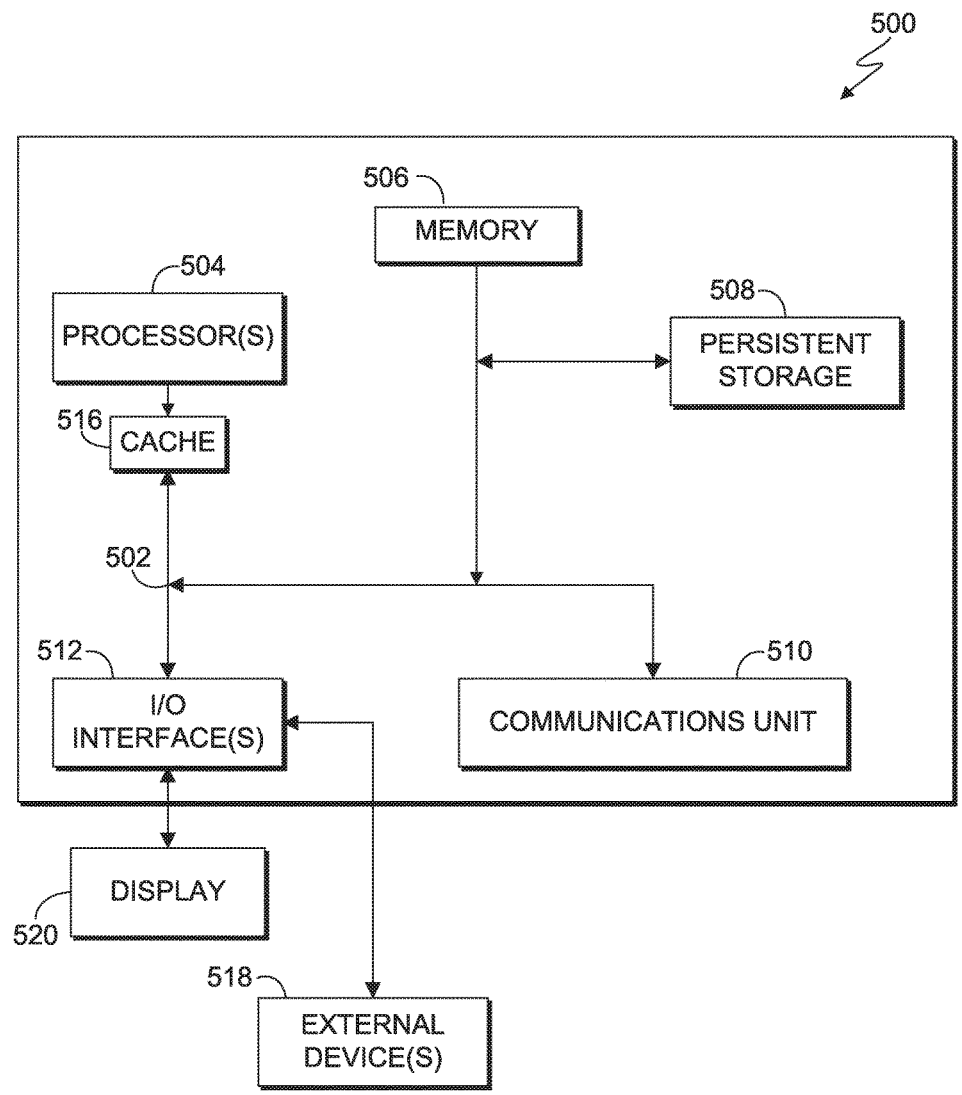
FIG. 5 depicts a block diagram of components of the computing device executing the temperature control program, in accordance with an embodiment of the present invention.

FIG. 5 is a block diagram depicting components of a computer 500 suitable for executing temperature control program 312. FIG. 5 displays the computer 500, the one or more processor(s) 504 (including one or more computer processors), the communications fabric 502, the memory 506, the cache 516, the persistent storage 508, the communications unit 510, the I/O interfaces 512, the display 520, and the external devices 518. It should be appreciated that FIG. 5 provides only an illustration of one embodiment and does not imply any limitations with regard to the environments in which different embodiments may be implemented. Many modifications to the depicted environment may be made.

As depicted, the computer 500 operates over a communications fabric 502, which provides communications between the cache 516, the computer processor(s) 504, the memory 506, the persistent storage 508, the communications unit 510, and the input/output (I/O) interface(s) 512. The communications fabric 502 may be implemented with any architecture suitable for passing data and/or control information between the processors 504 (e.g. microprocessors, communications processors, and network processors, etc.), the memory 506, the external devices 518, and any other hardware components within a system. For example, the communications fabric 502 may be implemented with one or more buses or a crossbar switch.

The memory 506 and persistent storage 508 are computer readable storage media. In the depicted embodiment, the memory 506 includes a random access memory (RAM). In general, the memory 506 may include any suitable volatile or non-volatile implementations of one or more computer readable storage media. The cache 516 is a fast memory that enhances the performance of computer processor(s) 504 by holding recently accessed data, and data near accessed data, from memory 506.

Program instructions for temperature control program 312 may be stored in the persistent storage 508 or in memory 506, or more generally, any computer readable storage media, for execution by one or more of the respective computer processors 504 via the cache 516. The persistent storage 508 may include a magnetic hard disk drive. Alternatively, or in addition to a magnetic hard disk drive, the persistent storage 508 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of the persistent storage 508.

The communications unit 510, in these examples, provides for communications with other data processing systems or devices. In these examples, the communications unit 510 may include one or more network interface cards. The communications unit 510 may provide communications through the use of either or both physical and wireless communications links. Temperature control program 312 may be downloaded to the persistent storage 508 through the communications unit 510. In the context of some embodiments of the present invention, the source of the various input data may be physically remote to the computer 500 such that the input data may be received and the output similarly transmitted via the communications unit 510.

The I/O interface(s) 512 allows for input and output of data with other devices that may operate in conjunction with the computer 500. For example, the I/O interface 512 may provide a connection to the external devices 518, which may include a keyboard, keypad, a touch screen, and/or some other suitable input devices. External devices 518 may also include portable computer readable storage media, for example, thumb drives, portable optical or magnetic disks, and memory cards. Software and data used to practice embodiments of the present invention may be stored on such portable computer readable storage media and may be loaded onto the persistent storage 508 via the I/O interface(s) 512. The I/O interface(s) 512 may similarly connect to a display 520. The display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for preventing damage to a tape library, the method comprising:
   receiving, by one or more processors, a first sensor reading, wherein the first sensor is located within a tape library;
   receiving, by one or more processors, a second sensor reading, wherein the second sensor is located external to the tape library;
   determining, by one or more processors, that the second sensor reading is greater than or equal to the first sensor reading;
   receiving, by one or more processors, an indication that a door to the tape library is open; and
   responsive to the indication that the door to the tape library is open, disabling a fan.

2. The method of claim 1, wherein the first sensor and the second sensor are each a temperature sensor.

3. The method of claim 1, wherein the first sensor and the second sensor are each a humidity sensor.

4. The method of claim 1, wherein the fan is located within a tape drive of the tape library.

5. The method of claim 1, wherein:
   the first sensor reading comprises temperature and humidity data from the first sensor; and
   the second sensor reading comprises temperature and humidity data from the second sensor.

6. The method of claim 5, wherein determining that the second sensor reading is greater than or equal to the first sensor reading comprises:
   calculating, by one or more processors, a dew point temperature from the temperature and humidity data from the second sensor; and
   comparing, by one or more processors, the dew point temperature to the temperature data from the first sensor.

7. The method of claim 1, further comprising:
   receiving, by one or more processors, an indication that the door to the tape library is closed; and
   responsive to receiving the indication that the door to the tape library is closed, restarting, by one or more processors, the fan.

* * * * *